US012606372B2

(12) United States Patent
Vent

(10) Patent No.: US 12,606,372 B2
(45) Date of Patent: Apr. 21, 2026

(54) ELEVATOR AND RACK SYSTEM

(71) Applicant: Rocket Solution GmbH, Wächtersbach (DE)

(72) Inventor: Florian Vent, Riemerling (DE)

(73) Assignee: Rocket Solutions GmbH, Waechtersbach (DE)

( * ) Notice: Subject to any disclaimer, the term of this patent is extended or adjusted under 35 U.S.C. 154(b) by 435 days.

(21) Appl. No.: 18/113,680

(22) Filed: Feb. 24, 2023

(65) Prior Publication Data

US 2023/0202756 A1     Jun. 29, 2023

Related U.S. Application Data

(63) Continuation of application No. PCT/EP2021/073306, filed on Aug. 23, 2021.

(30) Foreign Application Priority Data

Aug. 27, 2020     (DE) ........................ 10 2020 122 391

(51) Int. Cl.
  B65G 1/06         (2006.01)
  B65G 47/54        (2006.01)
(52) U.S. Cl.
  CPC .............. B65G 1/06 (2013.01); B65G 47/54 (2013.01)
(58) Field of Classification Search
  None
  See application file for complete search history.

(56) References Cited

U.S. PATENT DOCUMENTS

| | | | |
|---|---|---|---|
| 4,492,504 A | 1/1985 | Hainsworth | |
| 9,096,375 B2 * | 8/2015 | Lert ..................... | B65G 1/1378 |
| 9,725,238 B2 | 8/2017 | Mathys et al. | |
| 9,919,870 B2 * | 3/2018 | Langhoff ................. | B65G 1/04 |
| 10,035,649 B2 | 7/2018 | Lert et al. | |
| 10,173,839 B2 * | 1/2019 | Ahammer ............ | B65G 1/0492 |
| 11,893,533 B2 * | 2/2024 | Pankratov ............ | B65G 1/0485 |
| 2012/0141236 A1 * | 6/2012 | Korner ................. | B65G 1/0407 414/222.01 |
| 2013/0129469 A1 * | 5/2013 | Salichs ................. | B65G 1/026 414/807 |
| 2013/0209202 A1 * | 8/2013 | Schmit ..................... | B65G 1/06 414/807 |
| 2014/0301811 A1 | 10/2014 | Langhoff | |

FOREIGN PATENT DOCUMENTS

| | | |
|---|---|---|
| AT | 406151 B | 3/2000 |
| DE | 102011012424 B4 | 10/2012 |
| DE | 102015015127 A1 | 5/2017 |
| DE | 102017002631 A1 | 9/2018 |
| EP | 2557056 A2 | 2/2013 |
| KR | 20120013979 A | 2/2012 |
| WO | WO2013004695 A1 | 1/2013 |

OTHER PUBLICATIONS

International Search Report dated Dec. 10, 2021 in corresponding application PCT/EP2021/073306.

* cited by examiner

*Primary Examiner* — Mark C Hageman

(74) *Attorney, Agent, or Firm* — Muncy, Geissler, Olds & Lowe, P.C.

(57)     ABSTRACT

An elevator for a rack system for load carriers having a load-receiver, wherein the load-receiver comprises a displacement unit, and wherein the load-receiver comprises rollers. Further a rack system equipped with a corresponding elevator is also provided.

18 Claims, 6 Drawing Sheets

ELEVATOR AND RACK SYSTEM

This nonprovisional application is a continuation of International Application No PCT/EP2021/073306, which was filed on Aug. 23, 2021, and which claims priority to German Patent Application No 10 2020 122 391.9, which was filed in Germany on Aug. 27, 2020, and which are both herein incorporated by reference.

BACKGROUND OF THE INVENTION

Field of the Invention

The invention relates to an elevator and a rack system, in particular for a warehouse shuttle system for small load carriers.

Description of the Background Art

In automated warehouse technology, in the sub-area of small load carriers, i.e., load carriers with a maximum dimension of 400×600 mm and a maximum weight of 50 kg, the load carriers, which are often designed as boxes, are usually transported by a shuttle system in a rack system, which is therefore also referred to as a warehouse shuttle system. The rack system comprises several racks arranged side by side, which in turn usually comprise several levels. Between in each case two shelves, aisles for at least one shuttle each are arranged. This transports the load carriers to a rack bay of the rack assigned by the logistics system and stores them there or retrieves a load carrier from a rack bay and transports it to a handover area. This is usually arranged on an end face of the rack and comprises at least one handover location per rack system on each level and one or more elevators which transport the load carriers to the different levels of the racks. When storing, the load carriers are conveyed to the rack system on a feed plane, which is provided, for example, on the assigned floor of the hall, by means of conveyor technology and taken over by the elevator with a load-receiver and transported to the predetermined rack level. There, the load carrier is again passed from the elevator to a handover location, which can be designed with driven and/or non-driven rollers or with supports. From the handover location, the load carrier is taken over by the shuttle with the help of the load-receiver of the shuttle and subsequently transported by this to the assigned rack bay. There, the shuttle is positioned in relation to the rack bay and the load carrier is moved into the rack bay.

The German patent 102011012424 B4, which corresponds to US 2014/0056672, discloses an elevator referred to as a lifter, which comprises a load-receiver with a displacement unit. The displacement unit comprises tines which can be extended and retracted in the plane of the load-receiver. Furthermore, the load-receiver can be adjusted in height by a movement of the lifter, so that when storing, the load carriers referred to as storage units are first moved by the displacement unit over a handover location and then set down by lowering the lifter onto the handover location. During retrieval, the order is reversed. The tines can thus lift load carriers and move them in the direction of movement of said displacement unit, but it is not possible to move the load carriers perpendicular to the direction of movement of the displacement unit. This has the disadvantage that the lifter can only pick up a load carrier by extending the tines and subsequently lifting the load carrier.

For example, the lifter cannot be loaded directly perpendicular to the direction of movement of the displacement unit by the conveyor system.

SUMMARY OF THE INVENTION

It is therefore an object of the present invention to provide an elevator and a rack system, which allows for a more efficient loading of the storage system and an improved utilization of the available space.

An elevator according to an exemplary embodiment of the invention for a rack system for load carriers comprises a load-receiver having a displacement unit, wherein according to the invention the load-receiver comprises at least one conveyor element, in particular one or more rollers, which is or are suitable for moving a load carrier arranged on the load-receiver perpendicular to the direction of movement of the displacement unit. In this context, a load-receiver is to be understood as the part of an elevator with which a load carrier is transported, for example from an elevator to a handover location of the rack system of the warehouse shuttle system. The displacement unit is the part of the load-receiver which moves the load carrier in a plane parallel to the rack bay.

By the inventively created possibility of moving a load carrier arranged on the load-receiver perpendicular to the direction of movement of the displacement unit, lateral loading of the elevator is made possible. As a result, with a suitable arrangement of the elevator, this can be loaded or unloaded by the conveyor technology via the rollers, wherein the displacement unit can move the load carrier perpendicular thereto to the handover location. This has the advantage that it is no longer necessary for the conveyor technology to hand over to the elevator using a handover location.

Furthermore, the conveyor element, in particular one or more rollers, may be connected to the displacement unit. As a result, for example, the rollers on which the load carrier rests can be moved together with the displacement unit.

The conveyor element of the load-receiver can be formed without a drive. The load carriers can be pushed onto or removed from the elevator platform by a powered conveyor system. This can be supported, for example, by belt drives arranged on the elevator platform.

In particular, the conveyor element can be powered by a drive. This has the advantage that no further conveyor technology, such as a belt drive on the elevator, is necessary and thus installation space can be saved. Furthermore, the storage technology connecting to the rack system for storing or retrieving the load carriers can be designed more easily.

Furthermore, the load-receiver may comprise a lifting device. This can be integrated in the part of the load-receiver which is firmly connected to the elevator or be part of the displacement unit. In the second case, the lifting device is moved with the displacement unit.

Due to the fact that the load-receiver comprises the lifting device, a vertical movement of the load carriers can be achieved, for example, in preparation for a handover of a load carrier, without the entire elevator having to be controlled vertically. This results in fewer moving masses in connection with a handover and this can be cycled faster.

Furthermore, the elevator may comprise an elevator platform which is connected to the elevator drive, and which receives the load carriers for their transport to the various levels of the rack system.

In particular, the load-receiver may be part of the elevator platform. Depending on the operating condition, the load carrier can rest on the displacement unit or on the load-receiver. In a raised position, i.e., when the lifting device is extended, the load carrier rests only on the displacement unit. Once the lifting device has been retracted, the load carrier may rest partly on the displacement unit and partly on the load-receiver.

In addition, the load carrier, with the displacement unit in an extended state, can be set down at a handover location of the warehouse shuttle system. This has the advantage that the handover location does not have to include its own conveyor technology, such as powered rollers or a belt drive, i.e., it can be passively designed. For example, a beam, an angle, a C-profile or a U-profile can be used as a receiver.

In particular, the setting down of the load carrier can be achieved by a method of the elevator and/or by the method of the lifting device. Depending on the accelerations defined by the power of the elevator motor, a lifting device can be dispensed with.

The load-receiver may also be designed in such a way that it can move load carriers, starting from the elevator in two opposite directions. An elevator can thus reach two shelves mutually disposed with their rear side to each other, i.e., with the back of the shelf facing away from the aisle, and the respective adjacent aisle. As a result, almost half of all elevators can be omitted which has an advantageous effect on the manufacturing costs of the warehouse shuttle system.

Furthermore, the elevator platform may comprise two or more load-receiver. As a result, at least two load carriers can be transported to another level at the same time with the elevator. As a result, especially when using one elevator for two shelves, as described above, the capacity of the stored and retrieved load carriers can be increased. In this case, the load-receiver do not necessarily have to be provided with a separate lifting device, even a design independent of the invention described above is conceivable and could be regarded as a separate inventive object.

In this case, the load-receiver may be arranged such that a load carrier can be moved to a neighboring load-receiver by a load-receiver.

In particular, the load carrier can be moved by a load-receiver to an adjacent load-receiver on the rollers of the load-receiver. Therefore, no additional conveyor technology is necessary to reach the second and the other possible load-receiver. The displacement of the load carriers on the elevator platform from one load-receiver to an adjacent load-receiver can be achieved by powered rollers. These can be arranged either on the load-receiver itself or on the elevator platform, or on both.

A rack system according to the invention having an elevator as described may in particular be designed in such a way that the elevator, an adjacent handover location and an aisle of the rack system adjacent to the handover location are arranged in such a way that a load carrier can be moved along an axis from the elevator to the handover location and from the handover location to the shuttle.

This arrangement makes it possible, as already described above, to design the handover location passively, i.e., without its own conveyor technology. This has the advantage that no conveyor technology has to be arranged in the rack itself, which has a positive effect on the manufacturing costs of the rack. Furthermore, this lateral access to the rack, i.e., perpendicular to the direction of movement of the shuttle, has the advantage that, as described above, several load-receiver can be arranged on one elevator platform, almost arbitrarily increasing the displacement efficiency of the shuttle rack.

In addition, the handover location may include rollers for moving a load carrier. If several handover locations are arranged side by side, for several load-receiver, a load carrier can be transferred between these handover locations, further increasing the flexibility of the system. For example, the shuttle can set down a load carrier on the first handover location directly adjacent to the rack. Depending on the load of the elevator, which may include three load-receiver, the load carrier can be moved to the handover location, which corresponds to an available load-receiver in the elevator. The displacement can either be realized with additional conveyor technology such as a belt drive or the rollers of the handover location can be powered by a drive.

Furthermore, the rack system may comprise a shuttle having a load-receiver.

In particular, the load-receiver of the elevator and the shuttle may be identical. As a result, development costs, manufacturing costs and maintenance costs can be advantageously reduced.

In addition, the rack system can include two or more handover locations.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
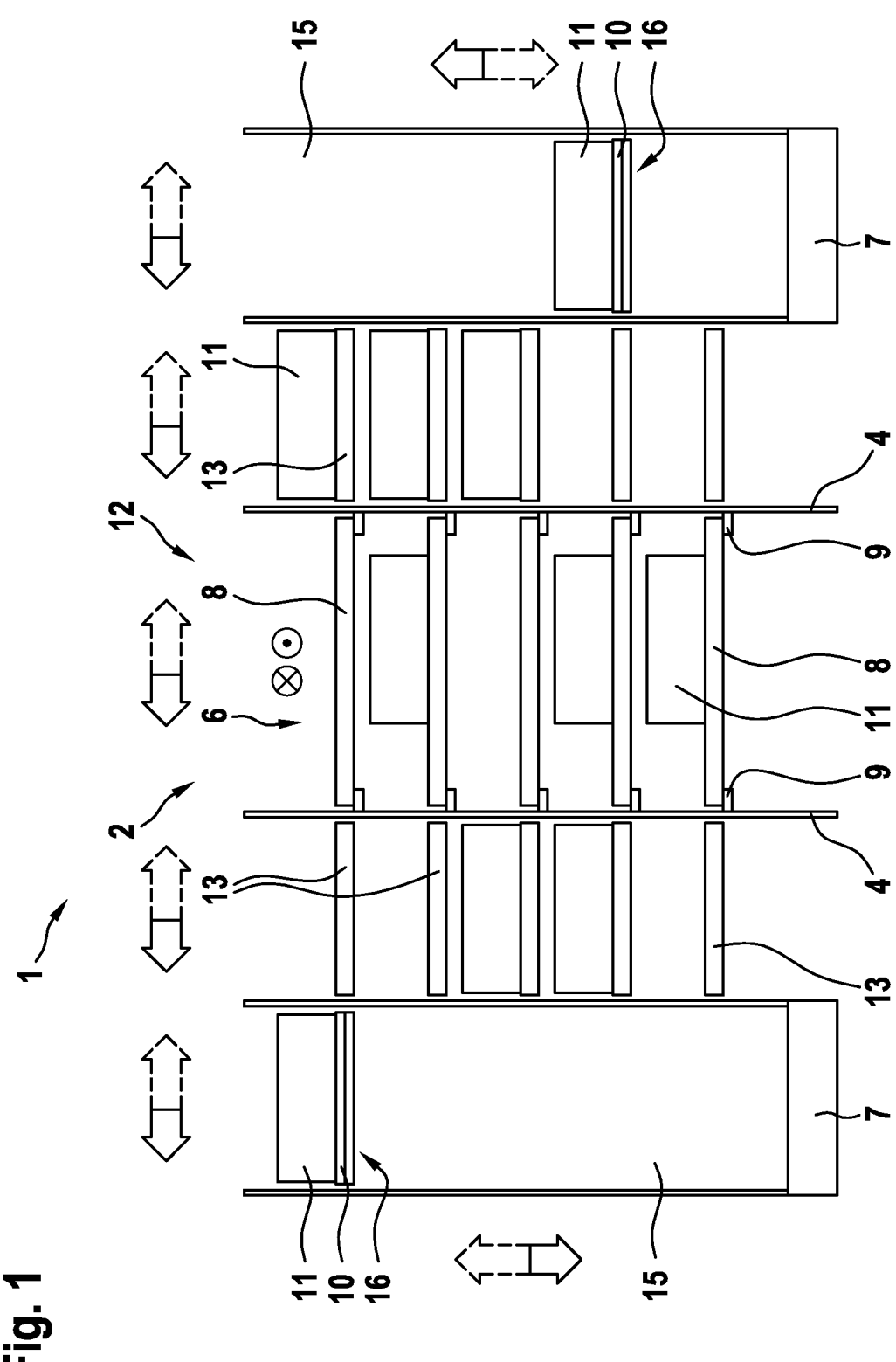
FIG. 1 is a schematic representation of a warehouse shuttle system in a frontal view.

FIG. 1 shows a schematic frontal view of a warehouse shuttle system 1, in which a rack system 2 with two shelves, concealed by a handover area 12 in the view shown, and an aisle 6 running between the shelves is displayed. The shelves are therefore arranged into the drawing plane, behind the handover area 12. The storage and retrieval of the load carriers 11 to the rack system 2 and the paths of the load carriers 11 in the rack system 2 are an important criterion for the efficiency of the warehouse shuttle system 1. The paths of the load carriers 11 are represented in FIG. 1 by arrows, wherein the two arrows running perpendicular to the drawing plane are intended to illustrate the transport of the load carriers 11 in the aisle 6. The part of the double arrow that is dashed and pointing in the opposite direction is intended to indicate that the warehouse shuttle system 1, and in particular the elevators 15, can be operated in a bidirectional mode, i.e., load carriers 11 can be stored or retrieved via one or both elevators 15. In the embodiment shown, the vertical movement of the load carriers 11 is achieved by the two elevators 15 with their elevator platforms 16. A load carrier 11 in a feed plane not separately designated in the figure, fed by conveyor technology 7, is moved in the illustrated embodiment to the elevator platform 16 of the right elevator 15. In the example shown, the feed plane is arranged on the floor of the assigned hall and can include conveyor belts or autonomous cars. Alternatively, the feed plane may also be located in any other level of the rack system 2. The elevator 15 brings the load carrier 11 to the level of the rack system 2 which is predetermined by a controller of the warehouse shuttle system 1. In the respective handover area 12 of the level, the load carrier 11 is first moved from a load-receiver 10 of the elevator platform 16 to a handover location 13 and subsequently to a shuttle 8. The shuttle 8, which can be moved between the shelves on rails 9 arranged on the risers 4 of the shelves, moves the load carrier 11 into the bay predetermined by the controller. During retrieval, the shuttle 8 fetches the load carrier 11 from a predetermined bay and transports it to the handover area 12. Whereas for storing, the handover location 13 and elevator 15 located in the figure on the right are used, the handover location 13 and elevator 15 located in FIG. 1 on the left are used for retrieval. This is a common procedure, whereby it is avoided that the paths of the stored and retrieved carriers 11 cross in the handover area 12 and the conveyor technology 7 either stores or retrieves the load carriers 11. However, it is also conceivable to store and retrieve the load carriers 11 with the elevators 15 and handover areas 13 being located on both sides of the rack system 2. In the illustrated embodiment of the warehouse shuttle system 1, the elevators 15 are arranged laterally next to the handover locations 13, whereby the frontal space requirement of the handover area 12 in front of the shelves intended for the storage of the load carriers 11 can be minimized. This is particularly advantageous if the arrangement has the same width as or a smaller width than the underlying rack system 2. This is the case, for example, if the shelves for storing three or more load carriers 11 are formed consecutively in a bay. Furthermore, in the rack system 2, no change of direction is necessary when transporting the load carriers 11 from the elevator 15 via the handover location 13 to the shuttle 8 arranged in the aisle 6. This advantageously reduces the conveyor technology on the rack, the complexity and thus the manufacturing costs and operating costs of the warehouse shuttle system 1. The loading of the elevator 15 and the transport from the elevator 15 to the handover location 13 is achieved by the inventive formation of a load-receiver 10 of the elevators 15 described in more detail in FIGS. 2a and 2b.

The shown arrangement of the elevators in relation to the shelves is conceivable independent of the other features of the invention and could be regarded as a separate inventive object.

Figure 2A:
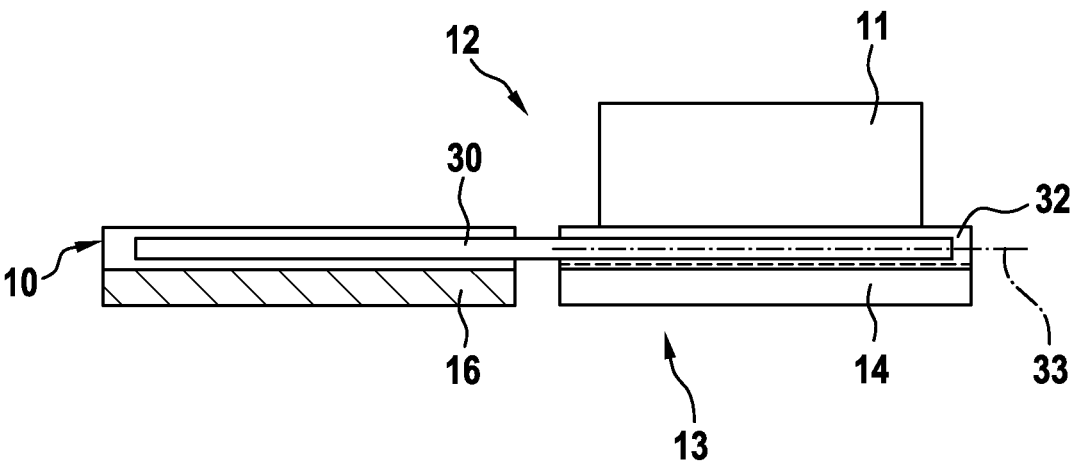
FIGS. 2a, 2b are in each case a schematic detail view of a handover area of a warehouse shuttle system in a sectional representation.
Figure 2B:
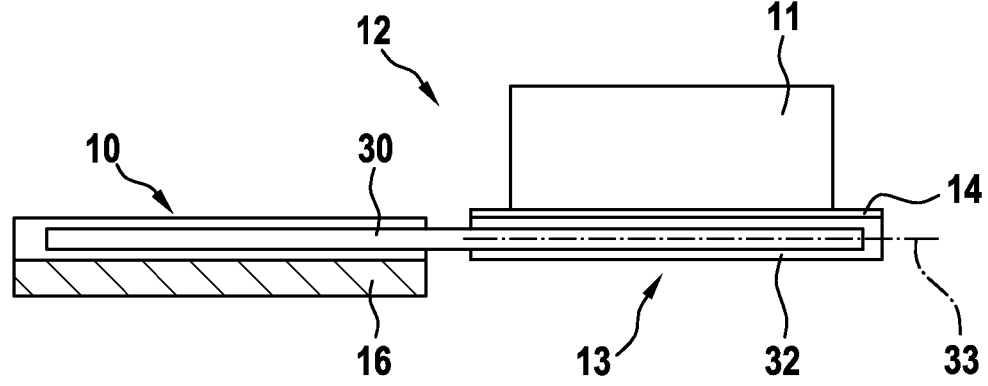

FIGS. 2a and 2b show identical regions of a handover area 12 in a sectional representation, in which an elevator platform 16 with a first embodiment of a load-receiver 10 and a handover location 13 are shown. FIGS. 2a and 2b show the handover area 12 at two different times to explain how the handover of the load carrier 11 from the elevator platform 16 to the handover location 13 is carried out. The load-receiver 10 comprises a displacement unit which is formed in the embodiment shown as a telescopic drive 30. This in turn comprises cylindrical rollers 32 for receiving the load carrier 11, wherein the rollers 32 are arranged in such a way that the load carrier 11 can be moved in a direction perpendicular to the drawing plane on the rollers 32, which can rotate about their axis of rotation 33. The rollers 32 are used for the following described movement of the load carrier 11 from the elevator platform 16 to the handover location 13 as a support for the load carrier 11, wherein the further function of the rollers 32 is described in detail in FIG. 3. In both FIGS. 2a and 2b, the telescopic drive 30 is shown in an extended position.

FIG. 2a shows a first arrangement in which the receiver 14, designed for example as beams, as angles, as C-profiles or as a U-profile of the elevator platform 16 of the not-shown elevator 15, is positioned in such a way opposite the handover location 13, that the load carrier 11 hovers above the supports 14 on the rollers 32 of the extended telescopic drive 30.

FIG. 2b shows the state in which the elevator platform 16 was lowered such that the load carrier 11 now rests on the receiver 14 of the handover location 13. In the following, the telescopic drive 30 with the rollers 32, which no longer have contact to the load carrier 11 and largely cover the receiver 14 in the figure, can be retracted again. Subsequently, the elevator platform 16 can be moved to the next level. This has the advantage that no conveyor technology is installed in the rack system, which can minimize the complexity of the construction and, as a result, the manufacturing costs.

Figure 3:
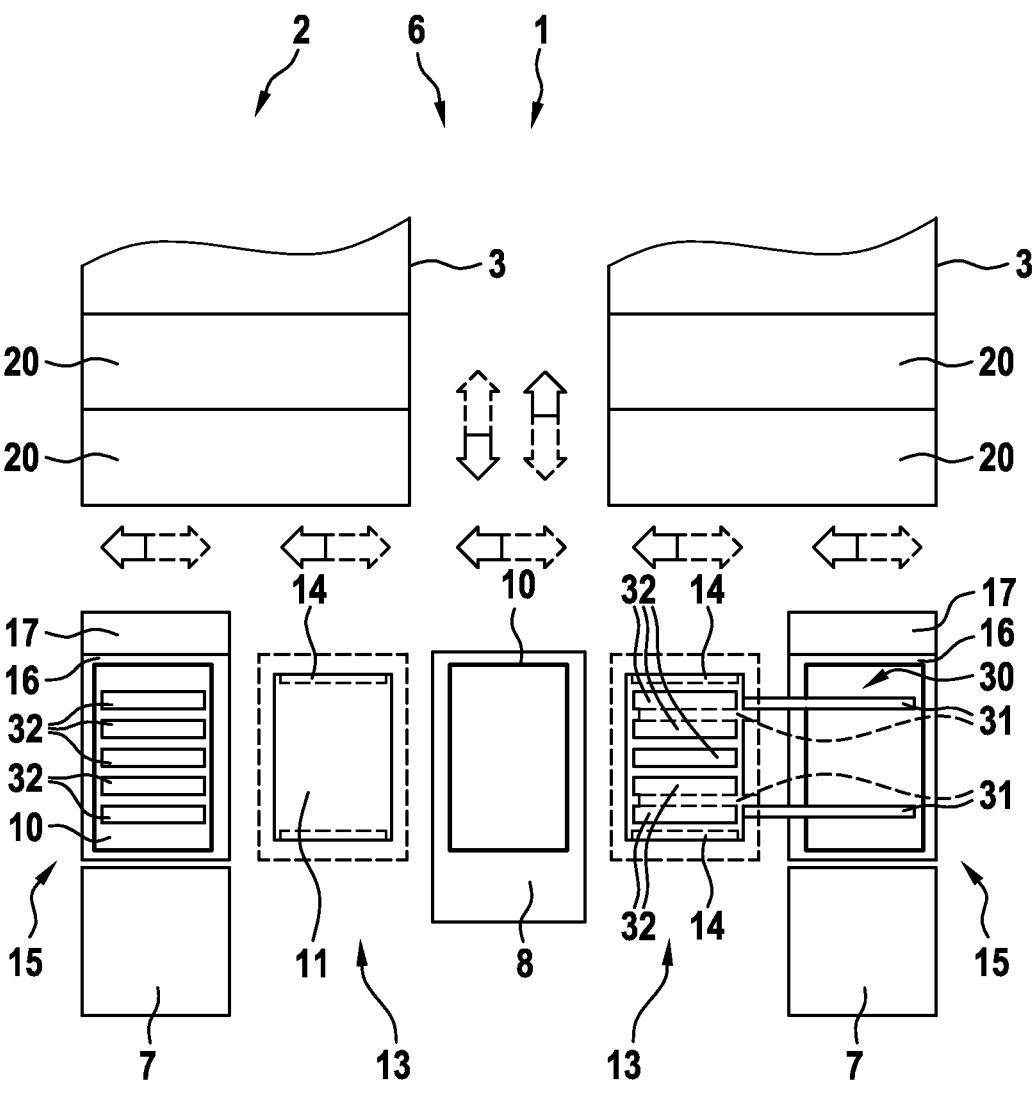
FIG. 3 is a schematic representation of a handover area in a top view.

FIG. 3 shows a top view on a front-side handover area 12 of two shelves 3 of a rack system 2 of a warehouse shuttle system 1 having two handover locations 13, two elevators 15 and a shuttle 8. The movement of the load carriers 11 is again represented by arrows, wherein the two arrows directed in or from the direction of the shelves 3 are intended to indicate the storage and retrieval of the load carriers 11 in the bays 20 of the shelves 3. As already described in FIG. 1, the parts of the double arrows shown dashed and pointing in the opposite direction are intended to indicate a possible bidirectional operation. The elevators 15 are guided on columns 17, which are arranged between the shelves 3 and the handover area 12, whereby on the opposite side of the columns 17, in the feed plane, a conveyor technology 7 can be arranged. When storing a load carrier 11 in unidirectional operation, this is transported by the conveyor technology 7 to the right elevator 15 and subsequently moved by the conveyor technology 7 via the powered rollers 32 of the telescopic drive 30 to a load-receiver 10 on an elevator platform 16 of the elevator 15. In this case, the load carrier 11 is moved into the elevator 15 on the rollers 32, which are arranged on the telescopic drive 30 of the load-receiver 10. The rollers 32 may be powered or non-powered depending on the design of the conveyor technology 7. The elevator 15 brings the load carrier 11 to the predetermined level and positions the elevator platform 16, as described in FIGS. 2a and 2b, in such a way opposite the assigned handover location 13 that when the telescopic drive 30 is extended, the load carrier 11 hovers over the receiver 14 of the handover location 13. Once the load carrier 11 is positioned above the receiver 14, the load carrier 11, together with the telescopic drive 30, is lowered by moving the elevator platform 16 through the elevator 15 until the load carrier 11 rests only on the receiver 14. The extension elements 31 of the telescopic drive 30 are retracted with the rollers 32, so that the elevator 15 can move the elevator platform 16 to another level. The left side of the handover area 12 shows a load carrier 11, which rests on the handover location 13 and waits for the takeover by the load-receiver 10 of the left elevator 15. The telescopic drive 30 is concealed by the rollers 32.

Figure 4A:
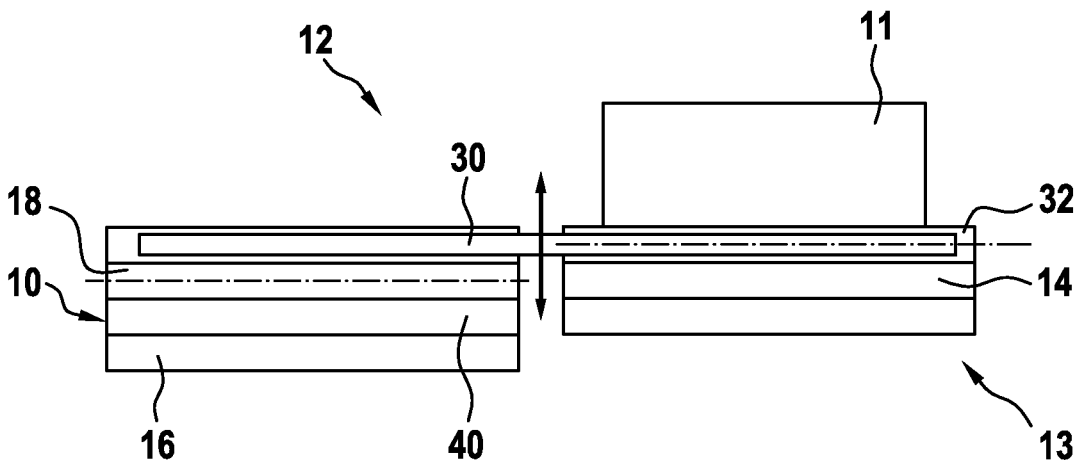
FIGS. 4a, 4b are in each case a schematic detailed representation of a handover area of a warehouse shuttle system in a sectional representation.
Figure 4B:
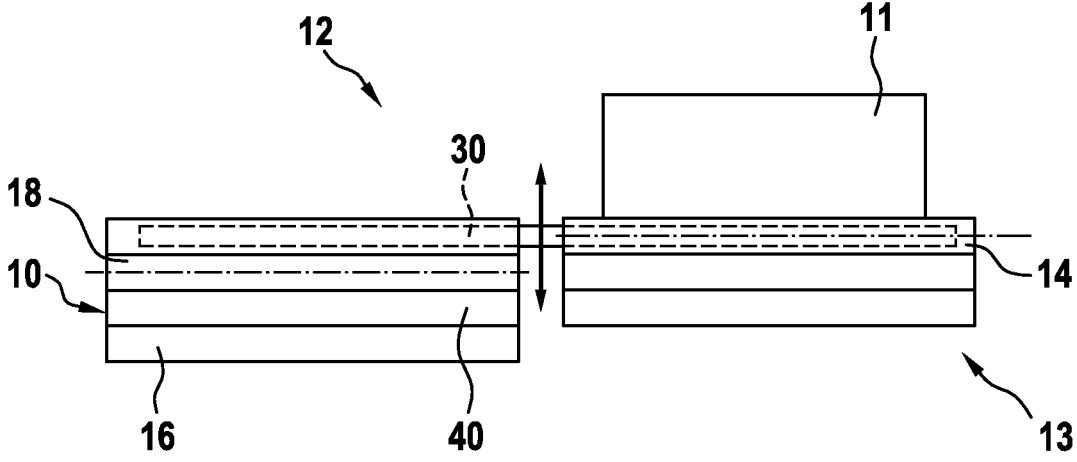

FIGS. 4a and 4b show, as already described in FIGS. 2a and 2b, identical regions of a handover area 12 in a sectional representation in which an elevator platform 16 is shown with a further embodiment of a load-receiver 10 and a handover location 13. In contrast to the embodiment of the load-receiver 10 of FIGS. 2a and 2b, the load-receiver 10 comprises an additional lifting device 40 in FIGS. 4a and 4b. FIGS. 4a and 4b also show the handover area 12 at two different times in order to explain how the load-receiver 10 operates. In both FIGS. 4a and 4b, the elevator platform 16 is positioned at the height of the handover location 13. The load-receiver 10 comprises a lifting device 40 and a displacement unit designed as a telescopic drive 30. The load carrier 11 rests on cylindrical rollers 32 of the telescopic drive 30, which are arranged such that the load carrier 11 can be moved in a direction perpendicular to the drawing plane on the rollers 32, which can rotate about their axis of rotation 33. For the following described handover of the load carrier 11 from the elevator platform 16 to the handover location 13, the rollers 32 are used as a support for the load carrier 11, wherein the further function of the rollers 32 is described in detail in FIG. 5.

FIG. 4a shows a first arrangement in which the lifting device 40 is extended, i.e., shown in its upper position. The telescopic drive 30 is also shown in an extended position, so that the load carrier 11 hovers over a receiver 14 of the handover location 13 on the rollers 32 of the telescopic drive 30. The load carrier 11 has thus been lifted off by the lifting device 40, together with the telescopic drive 30, from the cylindrical rollers 18 of the load-receiver 10 also serving as a support in this process step until the load carrier 11, resting on the rollers 32 of the telescopic drive 30, has lifted off from the rollers 18 of the load-receiver 10. Subsequently, the telescopic drive 30 was extended and the load carrier 11 was moved to be above the receiver 14 of the handover location 13.

FIG. 4b shows the state in which the lifting device 40, with it telescopic drive 30 extended, is lowered and the load carrier 11 rests on the receiver 14 of the handover location 13. In the following, the telescopic drive 30 with the rollers 32, which no longer contact the load carrier 11 and are covered in the figure by the receiver 14, can be retracted again. Subsequently, the elevator platform 16 can be moved to the next level. The receiver 14 is designed as a passive element without further functions, such as a beam, an angle, a C-profile or U-profile with non-slip surfaces. This has the advantage that no conveyor technology is installed in the rack system, which can minimize the complexity of the construction and, as a result, the manufacturing costs.

Figure 5:
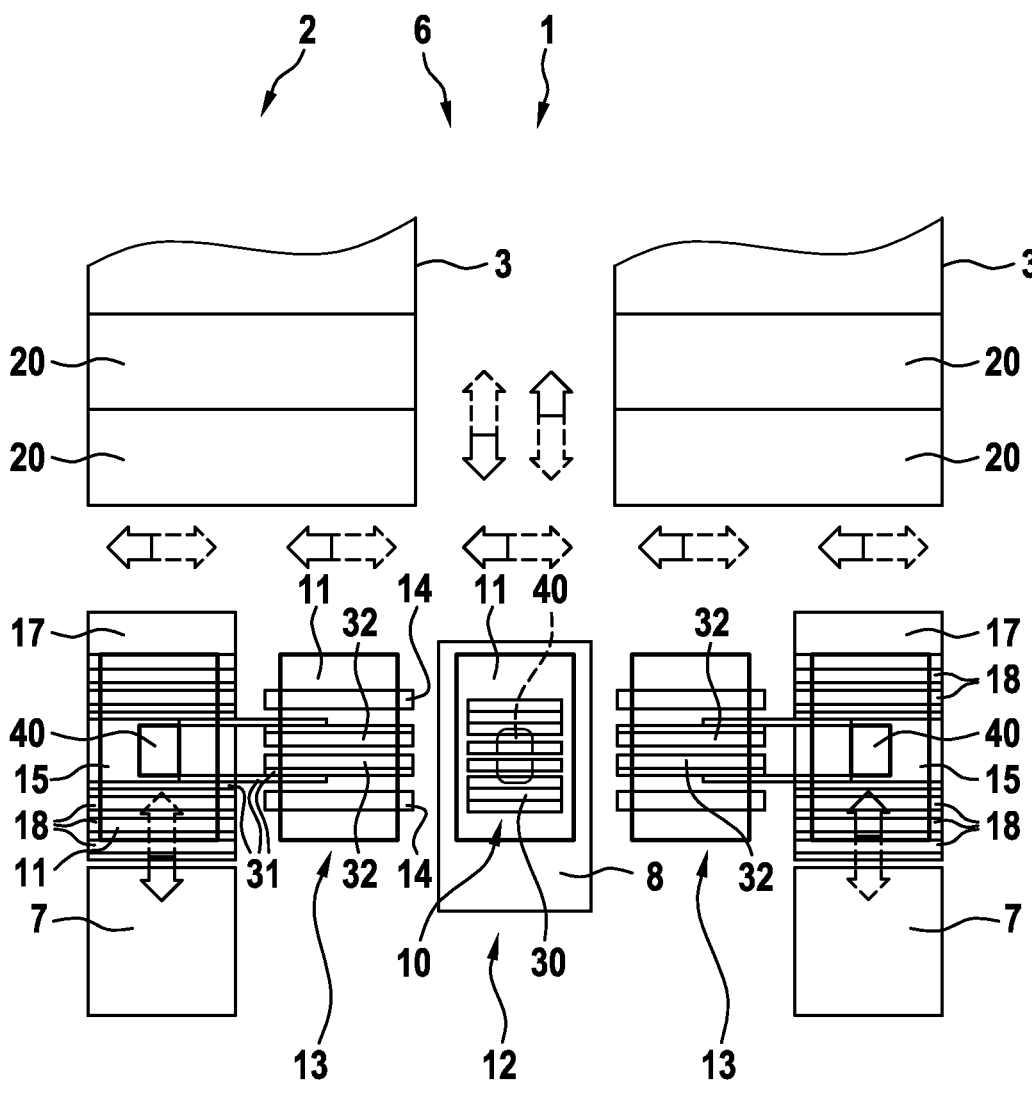
FIG. 5 is a schematic representation of a handover area in a top view.

FIG. 5 shows a top view on a front side handover area 12 of two shelves 3 of a rack system 2 of a warehouse shuttle system 1 with two handover locations 13, two elevators 15 and a shuttle 8. The movement of the load carriers 11 is again represented by arrows, wherein the two arrows directed in or from the direction of the shelves 3 are intended to indicate the storage and retrieval of the load carriers 11 in the bays 20 of the shelves 3. As already described in FIGS. 1 and 3, the parts of the double arrows that are dashed and pointing in the opposite direction are intended to indicate a possible bidirectional operation. The elevators 15 are guided on columns 17, which are arranged between the shelves 3 and the handover area 12, whereby on the opposite side of the columns 17 in the feed plane, a conveyor technology 7 can be arranged. When storing a load carrier 11, this is transported by the conveyor technology 7 to the right elevator 15 and subsequently moved by the conveyor technology 7 via powered rollers 18 to a load-receiver 10 on an elevator platform of the elevators 15, not separately shown in this figure. In this case, the load carrier 11 is moved both on rollers 18 of the load-receiver and on rollers 32 which are arranged on a telescopic drive 30 of the load-receiver 10. The rollers 18, 32 may be powered or non-powered depending on the design of the conveyor technology 7. Furthermore, the load-receiver 10 comprises an additional lifting device 40. This can raise and lower the load carrier 11 independently of the elevator 15 in the direction of movement of the elevator 15. The elevator 15 brings the load carrier 11 to the predetermined level and positions the elevator platform at the height of the level of the assigned handover location 13. The load carrier 11 is now raised, as described in FIGS. 4a and 4b, by the lifting device 40, so that the load carrier 11 now rests only on the two rollers 32 of the telescopic drive 30. The telescopic drive 30 moves the load carrier 11 to be above the receiver 14 of the handover location 13 by extending its extension elements 31. Once the load carrier 11 is positioned above the receiver 14, the load carrier 11, together with the telescopic drive 30, is lowered by the lifting device 40 until the load carrier 11 rests only on the receiver 14. The extension elements 31 of the telescopic drive 30 are retracted with the rollers 32, so that the elevator 15 can move the elevator platform to another level.

The shuttle 8 also comprises a load-receiver 10 having a telescopic drive 30 and a lifting device 40. The handover of the load carrier 11 from the receiver 14 of the handover location 13 to the shuttle 8 can thereby be identical or at least comparable to the handover from the elevator 15 to the receiver 14 of the handover location 13.

Figure 6:
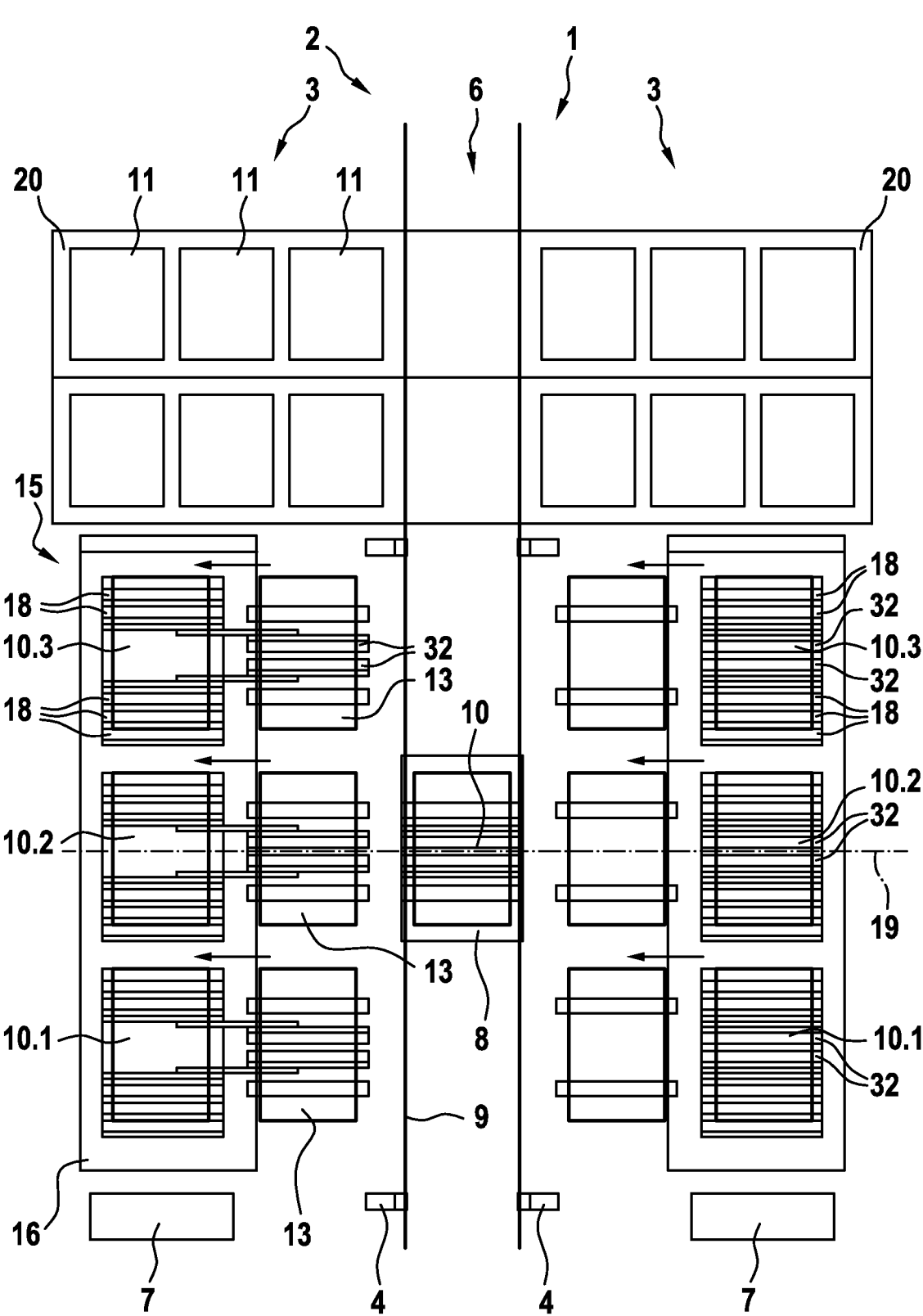
FIG. 6 is another embodiment of the invention.

FIG. 6 shows a further embodiment of the invention in which three load-receiver 10 are arranged on an elevator platform 16. The load-receiver 10 are arranged one behind the other from the viewpoint of the conveyor technology 7. The load-receiver 10 on the right side of FIG. 6 are retracted, i.e., in the position in which they can be loaded by the conveyor technology 7. The rollers 18 of the load-receiver 10.1, 10.2, 10.3 are arranged in such a way that it is possible for the conveyor technology 7 to load through from the first 10.1 to the third load-receiver 10.3 using the individual load-receiver 10 on the rollers 18. The rollers 18 may be powered or non-powered depending on the embodiment of the conveyor technology 7. The elevator 15 can thereby move at least three load carriers 11 simultaneously to one or more predetermined levels of the rack system 2 on an elevator platform 16 of the not separately designated feed plane. This enhances the capacity of storage and retrieval to the assigned rack systems 2. In less time, more load carriers 11 can be transported into the rack system 2 and out again. Once the predetermined level is reached, the load carrier 11, as described above and shown on the left side of FIG. 6, is moved from the load-receiver 10 of the elevator platform 16 to the assigned handover locations 13 and from there, is picked up by a shuttle 8 also via a load-receiver 10. The shuttle 8 moves back and forth on rails 9 arranged on risers 4 in the aisle 6 between the two shelves 3 of the rack system 2, thereby transporting the load carriers 11 into the bays 20 of the shelves 3. The use of three or more load-receiver 10 on an elevator platform 16 is only possible by the, as compared to the prior art, lateral arrangement of the elevators 15, i.e., next to the handover locations 13. This in turn is possible because the load-receiver 10 on the shuttle 8 make loading of the bays 20 up to a depth of at least three load carriers 11 possible. The shelves 3 are thereby deeper and there is sufficient space in front of the shelves 3 to be able to arrange the elevators 15 laterally. The three or more load-receiver 10 of the elevators 15 can all be loaded from the direction of the conveyor technology 7. By means of the lateral arrangement of the elevators 15, the handover from the elevator 15 to the shuttle 8 can now also be delivered by the conveyor technology 7 in an axis 19 perpendicular to the loading of the elevator platform 15. This has the advantage that no change of direction has to be made when transferring from elevator 15 to shuttle 8, as would be necessary if the elevator were disposed at the end face of the rack system 2. By moving the load carriers 11 from the load-receiver 10 of the elevator platform 16 and the shuttle 8, no conveyor technology 7 is necessary at the handover location 13 arranged between the two, i.e., this may be passively formed. This has the advantage that no conveyor technology 7 is required in the rack system 2, making the construction of the rack system easier and more cost-effective. Furthermore, due to the telescopic drives 30 of the load-receiver 10 of the elevators 15 working in both directions, an elevator 15 for two shelves 3 mutually disposed with their rear side to each other, i.e., with the backs of the shelves facing away from the aisle 6, can also be used. As a result, almost half of all previously required elevators can be omitted. This is particularly possible because the elevators 15 have a higher capacity due to the plurality of load-receiver 10, since, for example, fewer empty runs to the feed plane are necessary.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An elevator for a rack system for load carriers, the elevator comprising:
    a load-receiver comprising:
        a displacement unit; and
        at least one conveyor element for moving a load carrier arranged on the load-receiver substantially perpendicular to a direction of movement of the displacement unit,
    wherein the displacement unit is a telescopic drive that is extendable and retractable, and the at least one conveyor element is a cylindrical roller that is connected to the telescopic drive, the cylindrical roller being connected to the telescopic drive, such that when the telescopic drive moves linearly during an extension or retraction, the cylindrical roller moves linearly with the telescopic drive.

2. The elevator according to claim 1, wherein the at least one conveyor element is powered by a drive.

3. The elevator according to claim 1, wherein the load-receiver comprises a lifting device.

4. The elevator according to claim 3, wherein the load carrier, with the displacement unit in an extended state, is set down at a handover location of a warehouse shuttle system.

5. The elevator according to claim 4, wherein the setting down of the load carrier is achieved by moving the elevator and/or by moving the lifting device.

6. The elevator according to claim 1, wherein the elevator comprises an elevator platform.

7. The elevator according to claim 6, wherein the load-receiver is part of the elevator platform.

8. The elevator according to claim 6, wherein the elevator platform comprises two or more load-receivers.

9. The elevator according to claim 8, wherein the load-receivers are arranged such that a load carrier is adapted to be moved from one of the load-receivers to an adjacent one of the load-receivers.

10. The elevator according to claim 9, wherein the load carrier is adapted to be moved from the one of the load-receivers to the adjacent one of the load-receivers on rollers of the one of the load-receivers.

11. The elevator according to claim 1, wherein the load-receiver is configured to move the load carriers, starting from the elevator, in two opposite directions.

12. A rack system comprising the elevator according to claim 1.

13. The rack system according to claim 12, wherein the elevator, an adjacent handover location and an aisle of the rack system adjacent to the handover location are arranged in such a way that a load carrier is adapted to be moved along an axis from the elevator to the handover location and from the handover location to a shuttle.

14. The rack system according to claim 13, wherein the handover location comprises rollers for moving a load carrier.

15. The rack system according to claim 13, wherein the rollers of the handover location are provided with a drive.

16. The rack system according to claim 12, wherein the rack system comprises a shuttle with a load-receiver.

17. The rack system according to claim 16, wherein the load-receiver of the elevator and the shuttle are substantially identically constructed.

18. The rack system according to claim 12, wherein the rack system comprises two or more handover locations.

* * * * *